(12) United States Patent
Reevell et al.

(10) Patent No.: US 12,267,920 B2
(45) Date of Patent: Apr. 1, 2025

(54) HEATER ASSEMBLY (71) Applicant: JT International S.A., Geneva (CH)

(72) Inventors: Tony Reevell, London (GB); Yingxu Zhang, Dongguan (CN)

(73) Assignee: JT International S.A. (CH)

( * ) Notice: Subject to any disclaimer, the term of this patent is extended or adjusted under 35 U.S.C. 154(b) by 278 days.

(21) Appl. No.: 17/640,121

(22) PCT Filed: Aug. 28, 2020

(86) PCT No.: PCT/EP2020/074151
§ 371 (c)(1),
(2) Date: Mar. 3, 2022

(87) PCT Pub. No.: WO2021/043693
PCT Pub. Date: Mar. 11, 2021

(65) Prior Publication Data
US 2022/0304116 A1  Sep. 22, 2022

(30) Foreign Application Priority Data
Sep. 6, 2019 (WO) ................ PCT/CN2019/104804

(51) Int. Cl.
*B32B 41/00* (2006.01)
*A24F 40/46* (2020.01)
(Continued)

(52) U.S. Cl.
CPC ............... *H05B 3/36* (2013.01); *A24F 40/46* (2020.01); *A24F 40/51* (2020.01); *A24F 40/70* (2020.01);
(Continued)

(58) Field of Classification Search
CPC ................ H05B 3/36; H05B 2203/003; H05B 2203/013; H05B 2203/016;
(Continued)

(56) References Cited

U.S. PATENT DOCUMENTS 4,532,164 A   7/1985  Claunch, II et al.
4,719,335 A   1/1988  Batliwalla et al.
(Continued)

FOREIGN PATENT DOCUMENTS

CN   203986080 U   12/2014
CN   105792686 A   7/2016
(Continued)

OTHER PUBLICATIONS

Search Report dated Nov. 30, 2023 from the Office Action for Chinese Application No. 202080062240.8 issued Dec. 14, 2023, 2 pages.
(Continued)

*Primary Examiner* — Michael N Orlando
*Assistant Examiner* — Joshel Rivera
(74) *Attorney, Agent, or Firm* — Lerner David LLP (57) ABSTRACT A method of fabricating a thin film heater includes providing a heating element supported on a surface of a flexible dielectric backing film; and attaching a layer of heat shrink film onto the surface of the dielectric backing film so as to at least partially enclose the heating element between the heat shrink film and the dielectric backing film. The method provides a much more precise and consistent method of assembling the heater assembly and improves the thermal properties and heat transfer to a heating chamber.

15 Claims, 8 Drawing Sheets (51) Int. Cl.

| | | |
|---|---|---|
| *A24F 40/51* | (2020.01) | |
| *A24F 40/70* | (2020.01) | |
| *B29C 61/02* | (2006.01) | |
| *H05B 3/36* | (2006.01) | |
| *B29K 627/18* | (2006.01) | |
| *B29K 671/00* | (2006.01) | |
| *B29K 679/00* | (2006.01) | |
| *B29L 31/00* | (2006.01) | |

(52) U.S. Cl.
CPC .......... *B29C 61/02* (2013.01); *B29K 2627/18* (2013.01); *B29K 2671/00* (2013.01); *B29K 2679/08* (2013.01); *B29L 2031/7414* (2013.01); *H05B 2203/003* (2013.01); *H05B 2203/013* (2013.01); *H05B 2203/016* (2013.01); *H05B 2203/017* (2013.01)

(58) Field of Classification Search
CPC ........ H05B 2203/017; H05B 2203/021; H05B 2203/022; H05B 3/34; A24F 40/46; A24F 40/51; A24F 40/70; B29C 61/02; B29K 2627/18; B29K 2671/00; B29K 2679/08; B29L 2031/7414
USPC .................... 156/60, 64, 350, 351, 378, 379
See application file for complete search history.

(56) References Cited

U.S. PATENT DOCUMENTS

| 5,286,952 | A | 2/1994 | McMills et al. |
|---|---|---|---|
| 5,408,574 | A | 4/1995 | Deevi et al. |
| 9,943,114 | B2 | 4/2018 | Batista |
| 2007/0007266 | A1 | 1/2007 | Sasaki et al. |
| 2013/0042865 | A1 | 2/2013 | Monsees et al. |
| 2015/0128969 | A1 | 5/2015 | Chapman et al. |
| 2015/0181936 | A1 | 7/2015 | Lyubomirskiy et al. |
| 2017/0042243 | A1 | 2/2017 | Plojoux et al. |
| 2017/0164657 | A1 | 6/2017 | Batista |
| 2018/0007741 | A1 | 1/2018 | Metz et al. |
| 2018/0027612 | A1 | 1/2018 | Roberts et al. |
| 2018/0045211 | A1 | 2/2018 | Okabe et al. |

FOREIGN PATENT DOCUMENTS

| CN | 106132218 A | 11/2016 |
|---|---|---|
| CN | 106455708 A | 2/2017 |
| CN | 205947109 U | 2/2017 |
| CN | 106659247 A | 5/2017 |
| CN | 107231790 A | 10/2017 |
| CN | 107531012 A | 1/2018 |
| CN | 107594622 A | 1/2018 |
| CN | 108013512 A | 5/2018 |
| CN | 108576948 A | 9/2018 |
| CN | 108851239 A | 11/2018 |
| CN | 108887756 A | 11/2018 |
| CN | 208144421 U | 11/2018 |
| CN | 109007989 A | 12/2018 |
| CN | 208370942 U | 1/2019 |
| CN | 208987201 U | 6/2019 |
| CN | 110173885 A | 8/2019 |
| DE | 202017000997 U1 | 5/2018 |
| DE | 102017003979 A1 | 8/2018 |
| EP | 0008912 A1 | 3/1980 |
| EP | 0128664 A1 | 12/1984 |
| EP | 0136861 A1 | 4/1985 |
| JP | S54150485 A | 11/1979 |
| JP | S60099634 A | 6/1985 |
| JP | H09245944 A | 9/1997 |
| JP | 2000023653 A | 1/2000 |
| JP | 2004186072 A | 7/2004 |
| JP | 2014524313 A | 9/2014 |
| JP | 2016110757 A | 6/2016 |
| JP | 2017520263 A | 7/2017 |
| JP | 2021516968 A | 7/2021 |
| KR | 101600787 B1 | 3/2016 |
| TW | 201704015 A | 2/2017 |
| WO | 2005068282 A1 | 7/2005 |
| WO | 2015035510 A1 | 3/2015 |
| WO | 2015172224 A1 | 11/2015 |
| WO | 201600533 A1 | 1/2016 |
| WO | 2016005533 A1 | 1/2016 |
| WO | 2016160749 A1 | 10/2016 |
| WO | 2017114760 A1 | 7/2017 |
| WO | 2019171331 A2 | 9/2019 |
| WO | 2020074611 A1 | 4/2020 |

OTHER PUBLICATIONS

International Search Report for PCT/EP2020/074151 dated Nov. 10, 2020. 4 pgs.
International Search Report for PCT/EP2020/074146 dated Oct. 30, 2020. 5 pgs.
Search Report dated Dec. 26, 2023 from the Office Action for Chinese Application No. 202080062239.5 Issued Jan. 4, 2024, pp. 1-2.
Search Report dated Jun. 18, 2024 from the Office Action for Chinese Application No. 202080062240.8 issued Jun. 21, 2024, 2 pages.
Aiche Neoprene thermal conductivity: https://www.aiche.org/conferences/aiche-annual-meeting/2018/proceeding/paper/197h-noble-gas-infused-neoprene-closed-cell-foams-ultra-low-thermal-conductivity-textiles#:~: text=We%20focus%20on%20neoprene%20foam,0.050%2D0.060%20W%2Fm%2DK. <https://www.aiche.org/conferences/aiche-annual-meeting/2018/proceeding/paper/197h-noble-gas-infused-neoprene-closed-cell-foams-ultralow-thermal-conductivity-textiles#:~: text=We%20focus%20on%20neoprene%20foam,0.050%2D0.060%20W%2Fm%2DK.> (retreived.
Matweb FEP thermal conductivity: <https://www.matweb.com/search/datasheet.aspx?matguid=c782af4519d949349d7c771ff6953314&n=1&ckck=1> (retrieved Jul. 26, 2024) (Year: 2024).

HEATER ASSEMBLY

CROSS-REFERENCE TO RELATED APPLICATIONS

The present application is a national phase entry under 35 U.S.C. § 371 of International Application No. PCT/EP2020/074151, filed Aug. 28, 2020, published in English, which claims priority to International Application No. PCT/CN2019/104804 filed Sep. 6, 2019, the disclosures of which are incorporated herein by reference.

TECHNICAL FIELD

The present invention relates to a method of fabricating a heater assembly, more particularly a heater assembly for an aerosol generating device.

BACKGROUND

Thin film heaters are used for a wide range of applications which generally require a flexible, low profile heater which can conform to a surface or object to be heated. One such application is within the field of aerosol generating devices such as reduced risk nicotine delivery products, including e-cigarettes and tobacco vapour products. Such devices heat an aerosol generating substance within a heating chamber to produce a vapour. One means to heat the consumable is to use a heater assembly comprising a thin film heater which conforms to a surface of a heating chamber to ensure efficient heating of an aerosol-generating substance within the chamber.

Thin film heaters generally comprise a resistance heating element enclosed in a sealed envelope of flexible dielectric thin film with contact points to the heating element for connection to a power source, the contact points usually soldered on to exposed parts of the heating element.

Such thin film heaters are generally manufactured by depositing a layer of metal onto the dielectric thin film support, etching the metal layer supported on the thin film into the required shape of the heating element, applying a second layer of dielectric thin film onto the etched heating element and heat pressing to seal the heating element with the dielectric thin film envelope. The dielectric thin film is then die cut to create openings for contacts which are soldered on to the portions of the heating element exposed by the openings These conventional thin film heaters, formed of a planar heating element sealed within an insulating thin film envelope, must then be attached to a surface to be heated. In the context of aerosol generating devices, this involves attaching the thin film heater to the outer surface of a heating chamber to form a heater assembly so as to transfer heat to an aerosol generating consumable placed within the chamber. This is generally achieved by attaching the thin film heater with an adhesive or other fastening means to hold the thin film heater against the heating chamber during use. Other techniques use additional pieces of thin film to wrap around the heater assembly to hold the thin film heater against the heating chamber. The thin film heater must then be connected to a power source when assembled in the device.

Such conventional thin film heaters and heater assemblies suffer from a number of disadvantages. Existing thin film heaters comprise a significant amount of insulating material surrounding the heating element which results in an increased thermal mass and reduces the efficiency of heat transfer to the heating chamber. This issue is made worse by the conventional method of attaching the thin film heater to a heating chamber involving the application of additional adhesive and/or additional wrapping layers. The attachment method, which generally must be carried out by hand, is an awkward procedure in which it is difficult to securely attach the heater and reliably position it with the correct alignment relative to the heating chamber. The latter is a particularly significant problem given the heating element usually needs to be placed accurately at a specific position along the heating element to align with the portion of a heating chamber to be heated.

The present invention aims to make progress in addressing these issues to provide an improved heater assembly and method of fabricating a heater assembly

SUMMARY OF THE INVENTION

According to a first aspect of the invention, there is provided a method of fabricating a heater assembly comprising: providing a heating element supported on a surface of a flexible dielectric backing film; and attaching a layer of heat shrink film onto the surface of the dielectric backing film so as to at least partially enclose the heating element between the heat shrink film and the dielectric backing film.

In this way, the number of thin film layers is reduced since the layer of heat shrink film provides both the function of sealing the heating element with the flexible backing film and also the means of attaching the heating element to a heating chamber. Therefore the thermal mass of the heater assembly is reduced and the efficiency of heat transfer is enhanced. Furthermore a secure attachment is provided by the heat shrink film in a simplified method in which sealing of the heating element and attachment may be carried out simultaneously. Heat shrinking provides a reliable close contact between the thin film heater and heating chamber to ensure effective heat transfer. The method further allows the heater to be placed accurately at the desired position on a heating chamber before heating to shrink the film and attach the heater at that position. The method therefore makes improvements over other attachment methods, such as using an adhesive, which do not reliably secure the heater at a required position.

The term "dielectric" used to define the backing film is intended to be interpreted broadly as meaning "electrically insulating".

The heating element is preferably a flexible heating element, preferably a flexible substantially planar heating element.

The assembled dielectric backing film, heating element and heat shrink film layer may be referred to as a thin film heater assembly or subassembly.

Preferably the method comprises attaching a layer of heat shrink film which extends beyond the surface area of the dielectric backing film in one or more directions. This allows for the extending portions of the heat shrink to be used to attach the heating element and supporting backing film to a surface. It further may allow for aligning of the heating element relative to a heating chamber by using one of the extending portions, where these portions extend by a predetermined distance beyond the heating element.

Preferably the layer of heat shrink film is attached directly against the heating element. In this way, the heating element is sealed directly between the flexible dielectric backing film and the layer of heat shrink such that an additional sealing layer is not required. In other words the heat shrink provides both a sealing layer and means of attachment.

Preferably the layer of heat shrink film is attached using an adhesive provided on the surface of the flexible dielectric layer which supports the heating element. The adhesive may be for example a silicon adhesive. The adhesive provides a straightforward means of reliably securing the heating element to the backing film. The flexible dielectric backing film may comprise a layer of adhesive, for example it may be polyimide film with a layer of Si adhesive. The heating element may be attached by subsequent heating of the flexible dielectric backing film, adhesive layer and positioned heating element to bond the heating element to the surface using the adhesive. The subsequent heating may be a heating step used to shrink the heat shrink film to attach the thin film heater to a heating chamber.

The backing film may comprise polyimide such as a polyimide film with a layer of Si adhesive. The backing film may alternatively or additionally comprise a fluoropolymer such as PTFE. When the backing film comprises a fluoropolymer it may comprise an at least partially defluorinated surface layer, formed for example by a surface treatment such as plasma and/or chemical etching. This allows for an adhesive to be applied to the treated surface which otherwise would not adhere given the extremely low friction surfaces provided by fluoropolymers. The backing film may additionally or alternatively comprise PEEK.

Preferably the flexible dielectric backing film has a thickness of less than 80 µm preferably less than 50 µm, and preferably a thickness of greater than 20 µm.

The heat shrink film may comprise one or more of polyimide, a fluoropolymer such as PTFE and PEEK. The heat shrink film is preferably a preferential heat shrink film arranged to shrink preferentially in one direction. For example the heat shrink film may be polyimide 208× tape manufactured by Dunstone. The heat shrink film may be in the form of an initially planar layer, i.e. a piece of heat tape arranged to be wrapped around the heating chamber or it may be in the form of a tube arranged to be passed around (i.e. sleeved on) a heating chamber and heated to shrink it to the surface of a heating chamber.

Preferably the heating element is a planar heating element comprising a heater track which follows a circuitous path over a heating area within the plane of the heating element; and two contact legs for connection to a power source, the contact legs extending away from the heater track in the plane of the heating element. Preferably the heater track is configured to provide substantially uniform heating over the heating area. The heater track path may be a serpentine or meandering path over the heating area and the heater track may have a substantially uniform width and thickness. Preferably the method comprises: attaching the layer of heat shrink film so as to enclose the heater track between the backing film and the heat shrink film layer, leaving the contact legs exposed. In this way the heater track is electrically insulated between the dielectric backing film and the heat shrink film whilst the contact legs are exposed such that they can be connected to a power source.

The contact legs may be sufficiently long to allow direct connection to a power source when the thin film heater is employed in the device. For example the length of the contact legs may be substantially equal or greater than one or both of the dimensions defining the heating area. The circuitous path may be configured to leave a vacant region within the heating area.

Preferably the layer of attached heat shrink film comprises an alignment region which extends beyond the heating element by a predetermined distance in a direction opposite to the direction of the extending contact legs. In particular the heat shrink film extends beyond the top edge of the heating element. In particular in an upward direction, i.e. a direction corresponding to towards the top, open end of the heating chamber when attached. By providing an alignment region which extends beyond the heating element and/or backing film by a chosen distance, the alignment region can be used to position the heating area of the heater at the required position. For example the method may further comprise aligning a top, marginal edge of the alignment region with an end of the heating chamber and attaching the thin film heater to the chamber using the heat shrink film. In this way, the heating area is positioned at a known location along the length of the heating chamber from the end of the chamber, without having to carefully measure or adjust the heating element to align it correctly. Preferably the predetermined distance is measured from the side of the heating area opposite the contact legs to the peripheral edge of the alignment region.

Preferably the method further comprises cutting a marginal part of the alignment region of the attached heat shrink film so that the distance in which the alignment region extends beyond the heater track is reduced to a predetermined distance. In this way, a precise distance between the edge of the heating area and the edge of the alignment region of the heat shrink can be provided so that the heating area can be accurately aligned relative to an edge of a heating chamber. The method may involve positioning and attaching a piece of heat shrink film which has dimensions larger than required and subsequently cutting the heat shrink film after attaching to provide a predetermined distance between the heating area and a peripheral edge of the alignment region. Precision stamping may be used to remove the excess marginal portion of the alignment region.

Preferably the layer of attached heat shrink film comprises an attachment region which extends beyond the flexible backing film. Preferably the attachment region extends beyond the backing film in a direction approximately perpendicular to the direction of the extending contact legs. In particular, the heat shrink film may have a width such that it extends beyond the heating element and flexible dielectric backing film in one or both directions which are perpendicular to the direction of extension of the heater contact legs. This direction may be referred to as the wrapping direction and is a direction approximately perpendicular to an elongate axis of the heater chamber when the thin film heater is attached to the heater chamber. The attachment portion of the heat shrink is preferably arranged to extend around the heating chamber when attached to secure the heating element to the heating chamber Preferably the attachment region of the heat shrink may extend sufficiently such that it can circumferentially wrap around an outer surface of the heating chamber. For example, the attachment region may extend by a distance corresponding to at least the width of the heating area (i.e. the dimension perpendicular to that direction of extension of the contact legs).

The attachment region may be in the form of a tubular portion of heat shrink which is sleeved around the heating chamber. For example, the heating element and supporting backing film may be wrapped into a tube and sleeved within a tubular heat shrink. The tubular heat shrink and tubular thin film heater within may then be sleeved onto a heating chamber and heated to secure the thin film heater to the heating chamber.

Preferably the method further comprises attaching a temperature sensor to the surface of the flexible dielectric backing film adjacent to the heating element; and attaching the heat shrink layer over the heating element and the temperature sensor. In this way, a temperature sensor may be sealed with the heating element between the backing film and heat shrink such that the heating temperature can be measured accurately and used to control the power supplied to the heating element to precisely control the heater. The heater track of the heating element may be shaped so as to leave a vacant region in or adjacent to the heating area and the temperature sensor may be placed in the vacant region. The temperature sensor may comprise a sensor head and sensor connections (e.g. wires) for carrying the sensed signal from the sensor head. The sensor head may be positioned between the backing film and heat shrink with the connections extending out from between the heat shrink and backing film so as to be exposed. The temperature sensor may be arranged such that the connection wires lie adjacent to the extended contact legs of the heater element to allow for mutual support and/or ease of connection to a PCB. The backing film may comprise a through hole wherein the temperature sensor head lies on the through hole so as to be exposed on the underside of the backing film (the underside being the side opposite to the side holding the heating element).

Preferably the layer of heat shrink film is attached so as to leave an edge region of the flexible dielectric backing layer next to the temperature sensor exposed, the region comprising an adhesive and the region being folded over the heat shrink film so as to seal the edge of heat shrink film next to the temperature sensor. In particular the heat shrink film may be positioned such that it does not extend to the edge of the dielectric backing film. That is, in a direction opposition to the direction of extension of the attachment portion there may be a peripheral side portion of the backing film which remains exposed, where the edge region may carry an adhesive. This region may be folded over to cover the temperature sensor and to seal the edge of the heat shrink film.

Preferably the dielectric backing film and the heat shrink film both comprise a corresponding arrangement of through-holes; wherein the method comprises: positioning the heating element and dielectric backing film on a positioning fixture comprising a corresponding arrangement of pins with relative positions corresponding to those of the holes of the backing film, such that the pins extend through the holes of the backing film; and positioning the heat shrink film onto the heating element and backing film such that the pins of the positioning fixture enter the holes of the heat shrink film, thereby aligning the heat shrink film with the dielectric backing film. In this way the heat shrink film can be precisely aligned relative to the backing film and heating element. The corresponding holes of the backing film and heat shrink and the corresponding pins of the positioning fixture provide a reference with which the components can be aligned relative to each other with high precision.

The assembled dielectric backing film, heating element and shrink wrap layer may be referred to as a thin film heater assembly and preferably the method further comprises wrapping the thin film heater assembly around the outer surface of a tubular heating chamber, preferably with the dielectric backing film in contact with the outer surface of the heating chamber; and heating the thin film heater assembly to shrink the heat shrink layer, securing the thin film heater assembly against the tubular heating chamber. In this way, the heat shrink film will shrink under heating to secure the thin film heater assembly tightly against an outer surface of the heater chamber. Preferably the heat shrink material extends beyond the dielectric backing film sufficiently in the wrapping direction such that the extending portion covers the heater track twice when wrapped around the heating chamber. Preferably the preferential heat shrink direction of the heat shrink film corresponds to the wrapping direction. By wrapping a layer of preferential heat shrink tape around the thin film heater to secure it to the heating chamber with the direction of the preferential heat shrink aligned with the wrapping direction, upon heating, the heat shrink layer contracts to hold the thin film heater tightly against the heater chamber. Preferably the thin film heater assembly is wrapped around the heating chamber such that the upper edge of the alignment region is aligned with the top of the heating chamber.

Preferably the heating chamber comprises one or more indentations in an outer surface and the thin film heater assembly is positioned relative to the heating chamber such that a temperature sensor, attached to the flexible dielectric backing film, is positioned within an indentation.

Preferably the method further comprises wrapping a further dielectric film around the attached thin film heater assembly. In some examples, the further dielectric film may have lower thermal conduction than the backing film.

In a further aspect of the invention there is provided an aerosol generating device manufactured according to the method as defined above or in any of the appended claims. In particular there is provided an aerosol generating device comprising a thin film heater assembly comprising a heating element supported on a surface of a flexible dielectric backing film and a layer of heat shrink film attached to the surface of the dielectric backing film so as to at least partially enclose the heating element between the heat shrink film and the dielectric backing film; and a tubular heating chamber; wherein the thin film heater assembly is secured against an outer surface of the heating chamber with the heat shrink film.

BRIEF DESCRIPTION OF THE DRAWINGS

Embodiments of the invention will now be described, by way of example only, with reference to the accompanying drawings, in which.

DETAILED DESCRIPTION

Figure 1A:
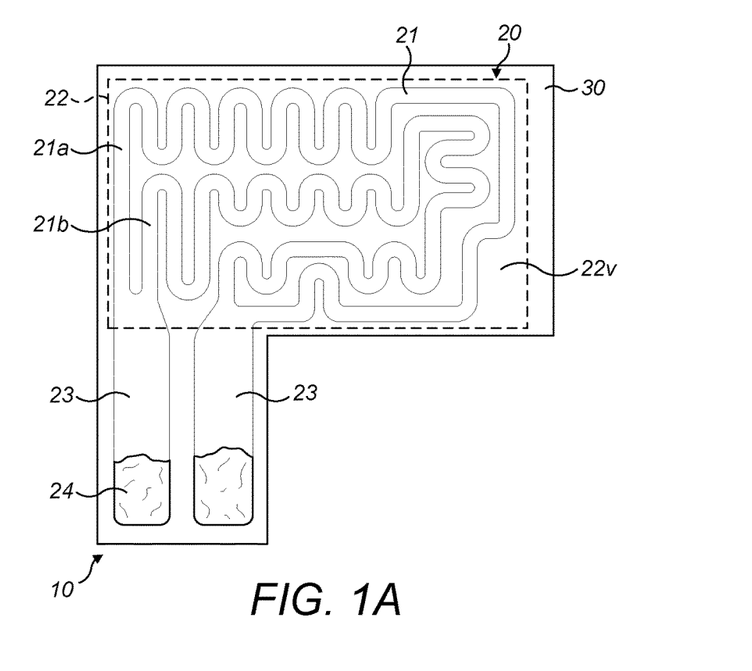
FIG. 1A illustrates a thin film heater including a heating element supported on a surface of a flexible dielectric backing film.
Figure 1B:
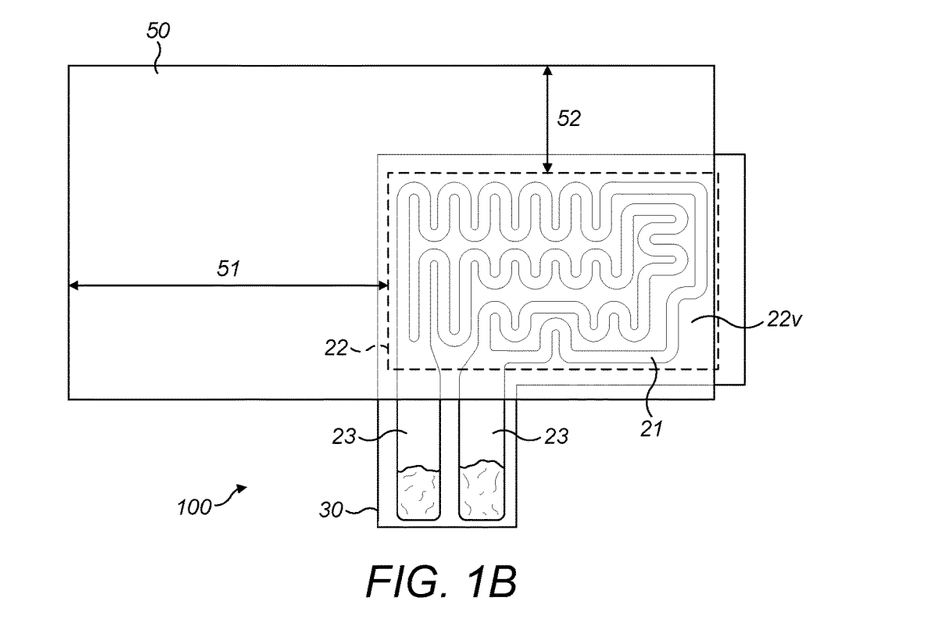
FIG. 1B illustrates a heater assembly fabricated according to the method of the present invention.

FIG. 1 schematically illustrates a method of fabricating a heater assembly 100 according to the present invention. The method includes providing a heating element 20 supported on a surface of a flexible dielectric backing film 30 and attaching a layer of heat shrink film 50 onto the surface of the dielectric backing film 30 so as to at least partially enclose the heating element 20 between the heat shrink film 50 and the dielectric backing film 30. The thin film heater assembly 100 may then be attached directly to a surface to be heated, such as the outer surface of the heating chamber of an aerosol generating device. The method provides a much more efficient, more precise and consistent method of assembling a heater which requires fewer parts. Since the heater assembly 100 requires fewer thin film layers then the conventional approach, the thermal mass of the heating arrangement is reduced, allowing for a greater efficiency of heat transfer to a surface to be heated. Furthermore, the heater assembly method requires only one heating step in order to bond the layers and secure the thin film heater assembly 100 to a heating chamber 60.

As shown in FIG. 1A, the first step involves providing a heating element 20 supported on a surface of a flexible dielectric backing film 30. This may be achieved in a number of different ways. In particular, the heating element 20 may be etched from a thin metal sheet of around 50 µm, for example a sheet of stainless steel such as 18SR or SUS304, although other materials and heater thicknesses may be selected depending on the application. The specific metal and thickness of the metal sheet are selected such that the resulting heating element 20 is flexible so that it can deform with the supporting flexible thin film 30 in order to conform to the shape of a surface to be heated. The metal sheet may be deposited initially on the surface flexible dielectric backing film 30, before being etched whilst supported on the film to form the heater track 21 pattern. Alternatively, the heating element 20 may be etched from a metal sheet independently of the flexible dielectric backing film. For example a free standing metal foil may be chemically etched from both sides in order to provide one or more connected heating elements 20 which are subsequently detached and positioned on the surface of a dielectric backing film 30.

The heating element is a planar heating element 20 including a heater track 21 which follows a circuitous path over a heating area 22 within the plane of the heating element 20. The heating element has two contact legs 23 allowing connection to a power source, the contact legs 23 extending away from the heater track 21 in the plane of the heating element 20. The heater track is preferably shaped so as to provide substantially uniform heating over the heating area 22. In particular, the heater track is shaped such that it contains no sharp corners and has a uniform thickness and width, with the gaps between neighbouring parts of the heater track 22 being substantially constant to minimise increased heating at specific points within the heating area 22. The heater track 21 in the example of FIG. 1a follows a serpentine path over the heater area 22 and is split into two parallel track paths 21a and 21b, each connected to both contact legs 23. The heater layer 23 may be soldered at connection point 24 on each contact leg 23 to allow for the connection of the heater to a PCB and power source.

The flexible dielectric backing film 30 must have suitable properties provide a flexible substrate to support and electrically insulate the heating element 20. Appropriate materials include polyimide, PEEK and fluoropolymers such as PTFE. In this case the heating element comprises a heater track pattern 21 etched from a layer of 50 µm stainless steel 18SR which is supported on a single sided polyimide/Si adhesive film comprising a 25 µm polyimide film with a 37 µm silicon adhesive layer. The heating element 20 is supported on the adhesive to allow the heating element to be attached to the backing film. The thin film heater 10 of FIG. 1A may be prepared in advance and stored with a release layer which is attached to the adhesive surface supporting the heating element 20 to preserve the adhesive layer until it is ready for use. The release layer may be provided for example by polyester or similar material. The release layer can then be peeled off to uncover the sticky adhesive layers supporting the heating element in order to proceed to the next assembly steps shown in FIG. 1B.

The next crucial step in the method of fabricating a heater assembly 100 is the application of a layer of heat shrink film 50 directly onto the surface of the dielectric backing film 30 so as to at least partially enclose the heating element 20 between the heat shrink film 50 and the backing film 30. The heat shrink film 50 can be attached with the adhesive directly onto the surface of the heater element 20 so as to enclose the heating area 20 between the backing film 30 and the heat shrink 50. In particular, the heater track 21 is insulated within a sealed envelope formed by the flexible backing film 30 and the heat shrink 50, while the contact legs 23 remain exposed to allow connection to a power source.

The heat shrink 50 is larger than the backing film 30 and heating element 20 such that it extends beyond the heating element 20 by predetermined distance in two orthogonal directions 51, 52. This alignment of the heat shrink 50 relative to the heating element 20 allows for the later alignment of the heating area 20 relative to the heating chamber 60. Therefore, careful control of the size of these extending portions of the heat shrink 51, 52 at this stage allows for the heater assembly 100 to be attached to a heating chamber 60 in a straightforward manner to provide precise alignment. The relative alignment of the heat shrink and thin film heater 10 can be achieved in a number of different ways. The heat shrink 50 may be pre-cut to correct size and then aligned to an edge of the flexible dielectric backing film 30 to provide the correct predetermined distances 51, 52 of the extending portions. Alternatively, as will be described below, a particular alignment apparatus may be used to achieve this precise alignment.

The heat shrink 50 extends beyond the heating area 20 in a direction opposite to the contact legs 23 to provide an alignment region 52 of the heat shrink 50. This alignment region 52 can be aligned with the top edge of a heating chamber 60 such that the heating area 20 is positioned at a position along the length of the heating chamber corresponding to the predetermined length 52 of the alignment region from the top edge of the heater track 21. In this way, the heater element 20 can be provided at a correct position along the heating chamber 60. The heat shrink 50 also has an attachment region 51 which extends past the heater track 21 and backing film 30 in a direction perpendicular to the direction of extension of the contact legs 23 to provide an attachment region 51. The direction of extension of the attachment region 51 may be referred to as the "wrapping direction" since this portion of the heat shrink 50 allows for it to be wrapped around a tubular heating chamber 60 and subsequently heat shrunk to provide the required tight connection. Similarly, the direction opposite to the heater legs 23 in the direction that the alignment region 52 extends from the heating element 20 may be referred to as the upward or alignment direction which corresponds with the elongate axis of the heating chamber 60, directed towards the top open end. These extension distances 51, 52 may be configured by cutting the heat shrink 50 to the correct dimensions either before or after attaching to the surface of the dielectric backing film 30.

Figure 2A:
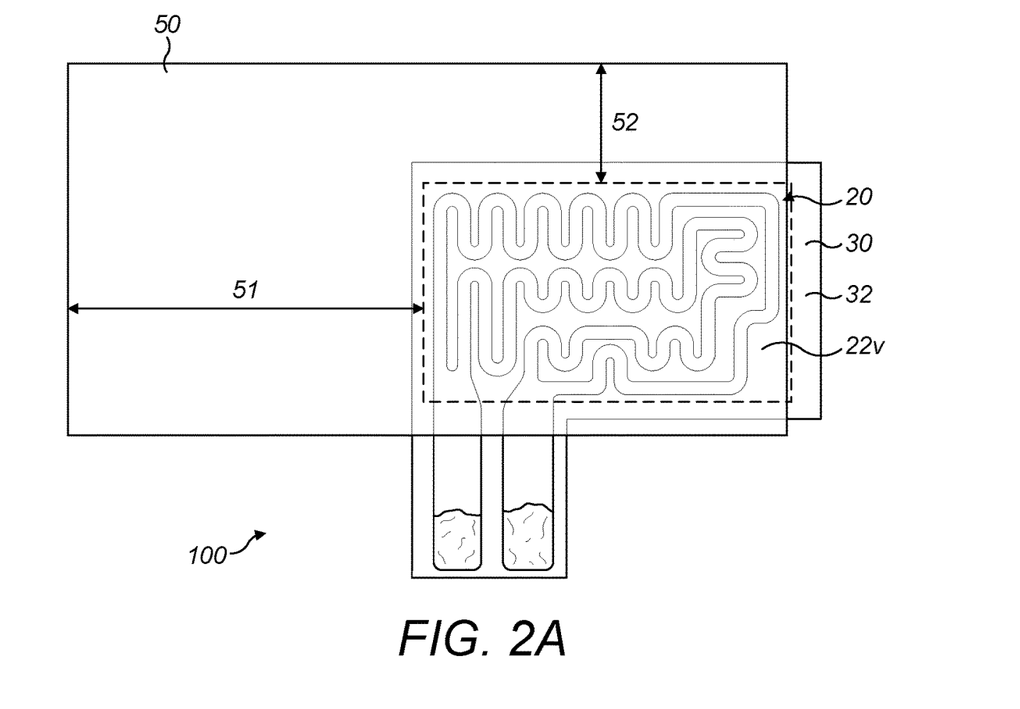
FIGS. 2A to 2H illustrate a method of fabricating a heater assembly according to the present invention.

FIG. 2A to 2H illustrate a method of attaching the thin film heater assembly 100 (formed of the heating element 20 supported on the dielectric backing film 30 with the attached heat shrink 50) to the outer surface of the heating chamber 60. FIG. 2A illustrates the positioning of the heat shrink 50 relative to the heating element 20 with the upwardly extending alignment portion 52 and the wrapping portion 51 extending away from the heating element 20 in the wrapping direction 51. The heat shrink film 50 may be attached at this stage by the adhesive provided on the surface of the backing film 30 or this may be achieved in a subsequent heating step which bonds the heat shrink 50 to the backing film 30.

Figure 2B:
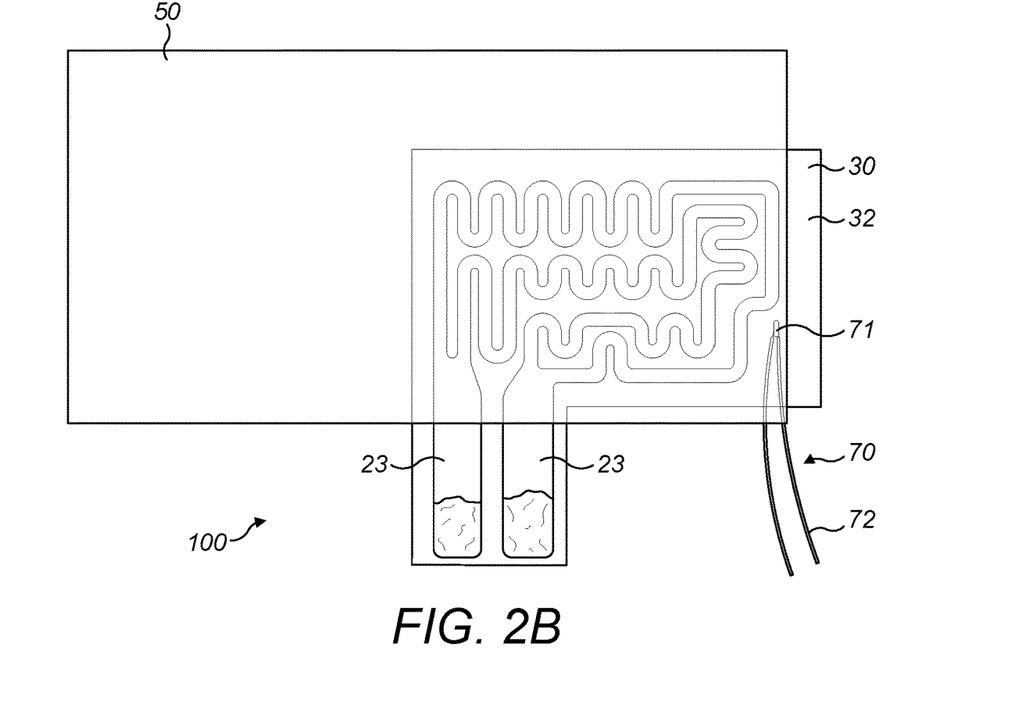

Next, as shown in FIG. 2B, a temperature sensor 70 is attached to the heater assembly 100 between the flexible backing film 30 and the heat shrink 50. The temperature sensor 70 in this case is a thermistor with a sensor head 71 configured to detect the local temperature and temperature sensor connections 72 configured to carry the sensed signal from the sensor head 71 to the PCB. The heater track 22 is preferably shaped so as to leave a vacant region 22v within the heating area 22, as most clearly shown in FIGS. 1A and 2A. The sensor head 71 is positioned in this vacant area 22v between the backing film 30 and the heat shrink 50 such that it is in close proximity with the heater track 21. By positioning the sensor head 71 in close proximity to the heating element 20 between the heat shrink 50 and the backing film 30 the temperature sensor 70 is sealed in close proximity to the heating element to provide accurate temperature readings of the heating area 22. The sensor connections 72 preferably extend in the same direction as the contact legs 23 of the heating element 20, which assists with the connection of the heater legs 23 and the sensor connection 72 to the PCB.

Figure 2C:
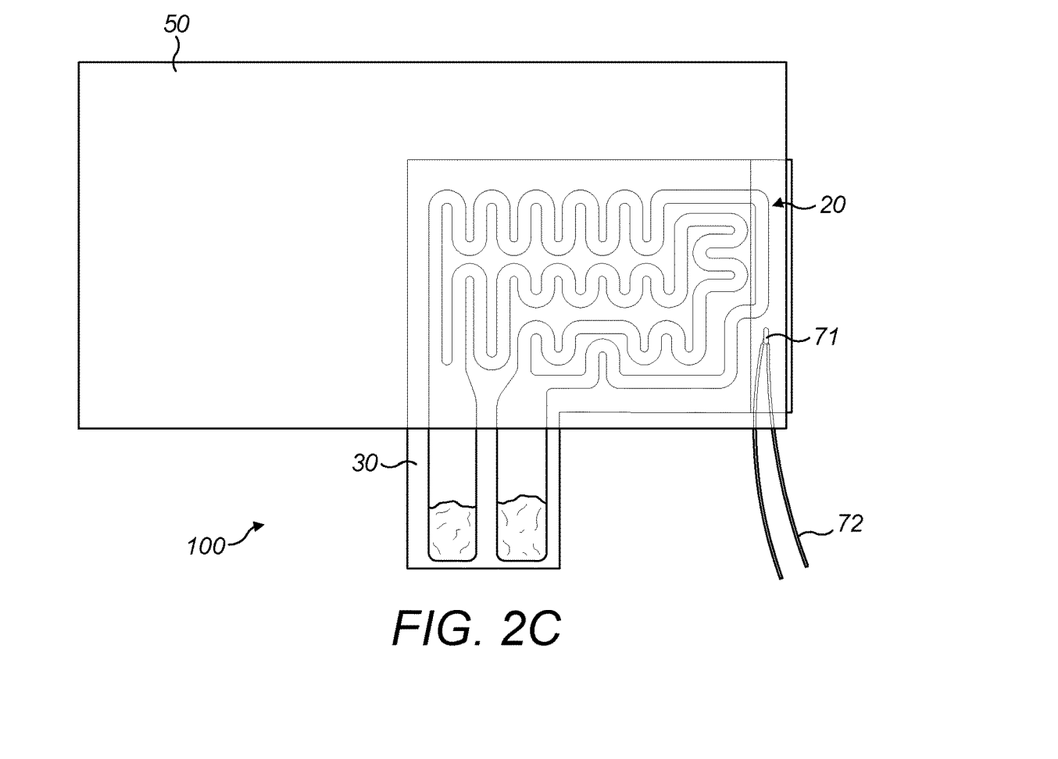
Figure 2D:
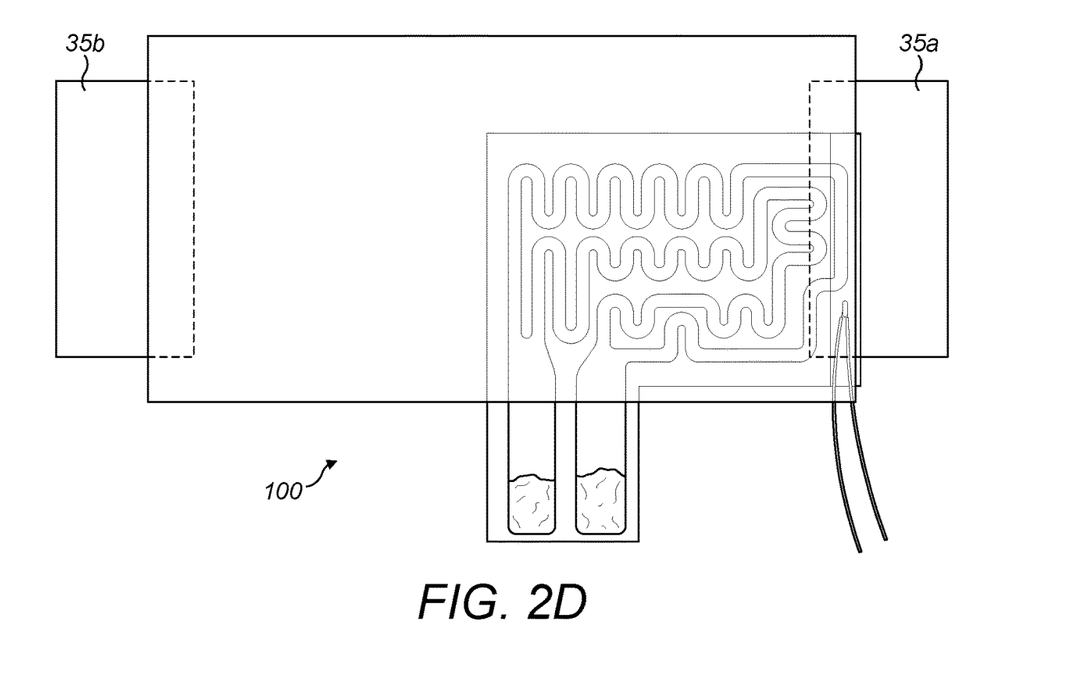

As shown in FIGS. 2A and 2B the heat shrink 50 is preferably positioned so as to leave a free edge region 32 of the backing film 30 exposed. As illustrated in FIG. 2C, this free edge region 32 is folded over onto the heat shrink film 50 to seal an edge of the backing film 30 and heat shrink 50. In particular, as the free edge region 32 comprises an adhesive on the surface this can be used to fold over the heat shrink 50 to seal this edge region. This can also be used to fold over the temperature sensor head 71 to secure it within the fold.

In the method of FIG. 2 the next step is to attach two pieces of adhesive tape 35a, 35b to attach the thin film heater assembly 100 to the heating chamber 60 at the correct position before heating the assembly to shrink the heat shrink. The sticky tape 35a, 35b may be provided by pieces of polyimide adhesive tape, for example 0.5 inch polyimide tape with 12.7 micrometre polyimide and 12.7 micrometre silicon adhesive. The sticky attachment tape 35a, 35b is positioned along each edge of the heat shrink at the extremities in the wrapping direction. As shown in FIG. 2E, the thin film heater 10 may then be attached to the heating chamber 60 by aligning the top edge 53 of the heat shrink 50 with the top edge 62 of the heating chamber 60. Given the distance 52 of the alignment region has been carefully selected this alignment step allows for the heating area 22 to be placed at the correct position along the heating chamber 60. Certain consumables will contain a charge of aerosol generating substance at a particular position so it is important that the correct portion of the heater chamber is heated to efficiently release the vapour from the consumable.

Figure 2E:
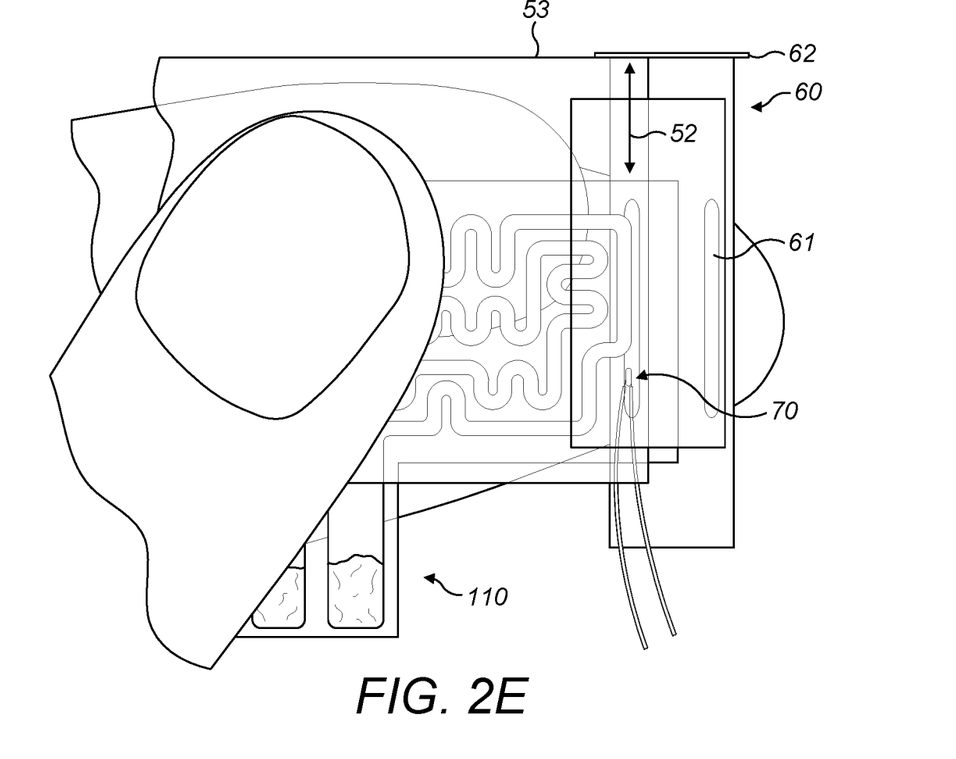

The thin film heater assembly 100 is initially attached to the heating chamber using the adhesive tape 35a. The heating chamber 60 is a tubular heating chamber arranged to accept a consumable to be heated in order to generate a vapour to be inhaled by a user. The heating chamber 60 preferably has one or more indentations 61 on an outer surface which provide internal protrusions which assist with the positioning and heat transfer to a consumable received within the chamber 60. The circumference of the heating chamber 60 preferably closely matches the width of the heating element 20 (the length in a direction perpendicular to the direction of extension of the contact legs) such that the heating element provides one complete circumferential loop around the chamber 60. In other examples the heater element might be sized to wrap more than once around the circumference of the heating chamber, i.e. the heating element may be sized so as to provide an integral number of circumferential loops around the heating chamber so as not to produce any variation in the heating temperature around the circumference of the heating chamber. The thin film heater assembly 100 is positioned and attached such that the temperature sensor head 71 lies within an indentation 61 on the outer surface on the heating chamber 60 to provide a more accurate reading of the internal temperature of the heating chamber 60.

Figure 2F:
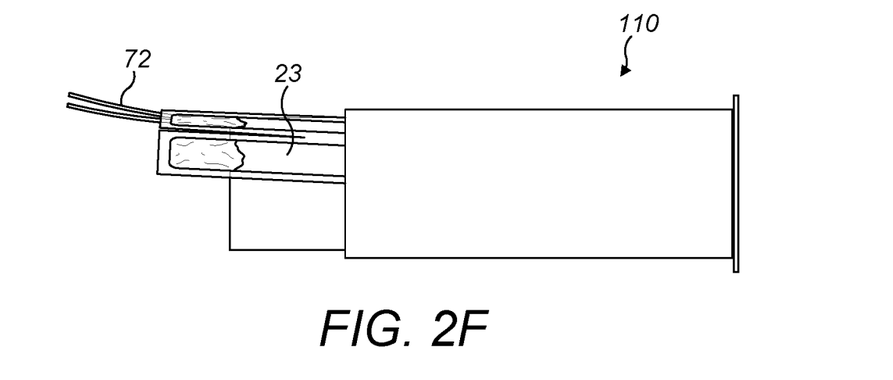

Once attached with first adhesive tape portion 35a, the thin film heater assembly 100 is then rolled around the heating chamber 60 with the extended attachment portion 51 of the heat shrink 50 wrapping circumferentially around the chamber 60 to cover the heating element 20 again before being attached by the second piece of attachment tape 35b to provide the attached heater assembly 110 (including the heater element 20, backing film 30, heat shrink film 50, thermistor 70 and heater chamber 60) shown in FIG. 2F. Since the length of the attachment region 51 is approximately the same as the length of the heating area 22 (and the circumference of the heating chamber 60), the attachment portion 51 wraps around to cover the heating area 22 once, such that the heater element is insulated by two layers of heat shrink film in the attached heater assembly 110 in FIG. 2F. The attachment region may be sized to provide more than one additional covering of the heating element 20. For example the attachment region 51 may extend beyond the heating element by a distance corresponding to an integer multiple of the outer circumference of the heating chamber 60.

Figure 2G:
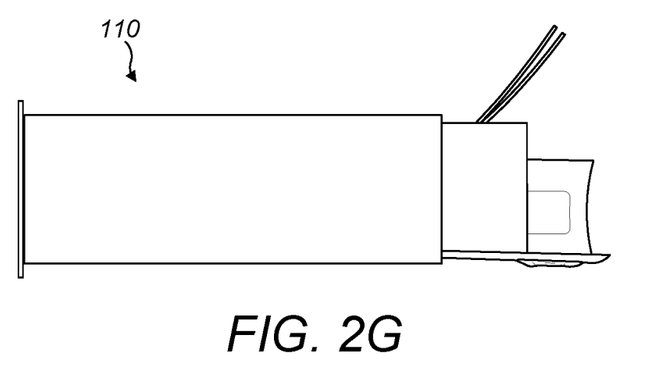

As can be seen in FIG. 2F the temperature sensor connections 72 and the heater leg 23 are positioned such that they are aligned following this rapid step for ease of connection to the PCB. The attached heater assembly 110 is then heated to shrink the heat shrink 50 tight against the heating chamber 60 as shown in FIG. 2G. For example, the assembly 110 can be heated in an oven at around 210° C. for ten minutes to shrink the film, although the time and temperature can be adapted for other varieties of heat shrink. This process allows large numbers of units to be heat treated in a small oven at the same time. This is the only heating step which can both simultaneously seal the thin film heater to the heating chamber and bond the backing film to the heat shrink.

Figure 2H:
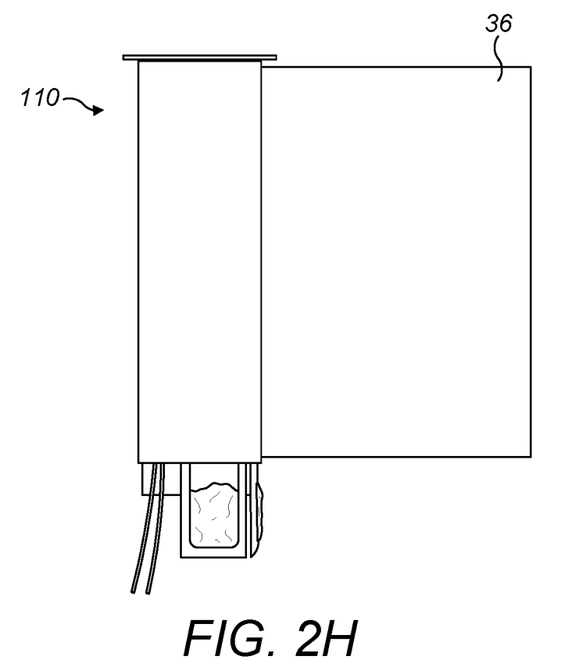

Finally, although not essential, a final layer of dielectric film 36 may be added around the outside of the heating element to complete the heating assembly as shown in FIG. 2H. This final dielectric layer may be for example a further layer of adhesive polyimide such as 1 inch polyimide tape with 25 micrometre polyimide and 37 micrometres silicon adhesive. This outer layer of dielectric film 36 provides a further layer of insulation and further secures the attachment of the thin film heater to the heating chamber 60. The thickness and/or material of the backing film 30, heat shrink 50 and final insulating layer 36 may be selected to enhance heat transfer to the heating chamber, for example with lower thermal conductivity layers provided outside the heating element (i.e. for the heat shrink 50 and insulating layer 36 in this example) and a higher thermal conductivity layer provided as the backing film. Once the outer insulating layer of dielectric film 36 has been applied, the assembly 110 may again be heated. This second heating step allows for further outgassing of the outer layer of dielectric film 36, as well as the other layers. For example, in the second heating stage, the heating temperature may be taken up to a higher temperature than the heat shrinking stage, closer to the operating temperature of the device. This allows for further outgassing, for example of the Si adhesive, that may not have taken place during the heat shrinking step at the lower temperatures. It is also beneficial to expose the heat shrink to a temperature closer to the operating temperature prior to heating during first use of the device.

Figure 3A:
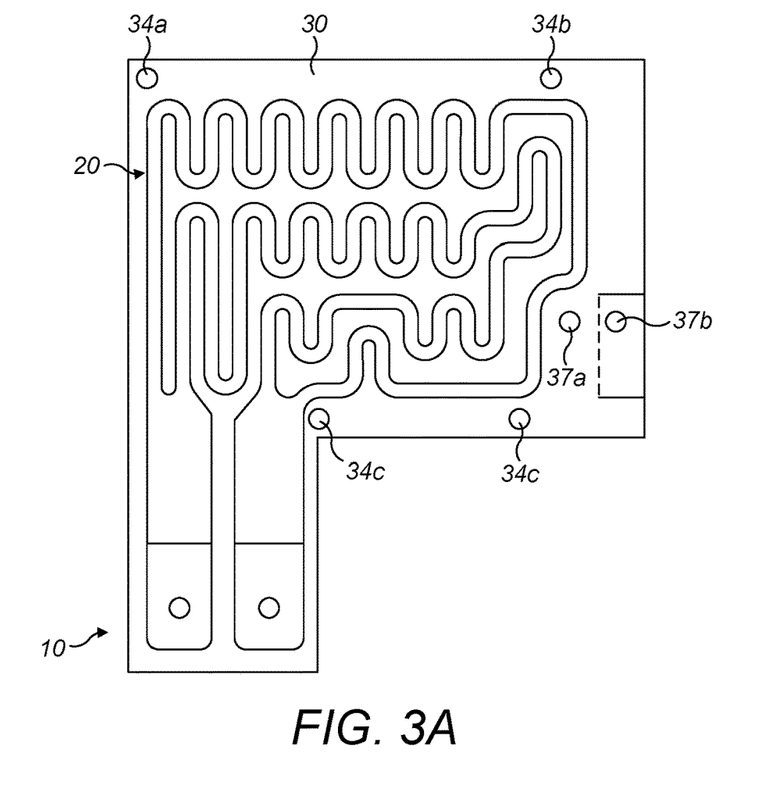
FIGS. 3A and 3B respectively illustrate a thin film heater and a layer of heat shrink film used in a method of fabricating a heater assembly according to the present invention.
Figure 3B:
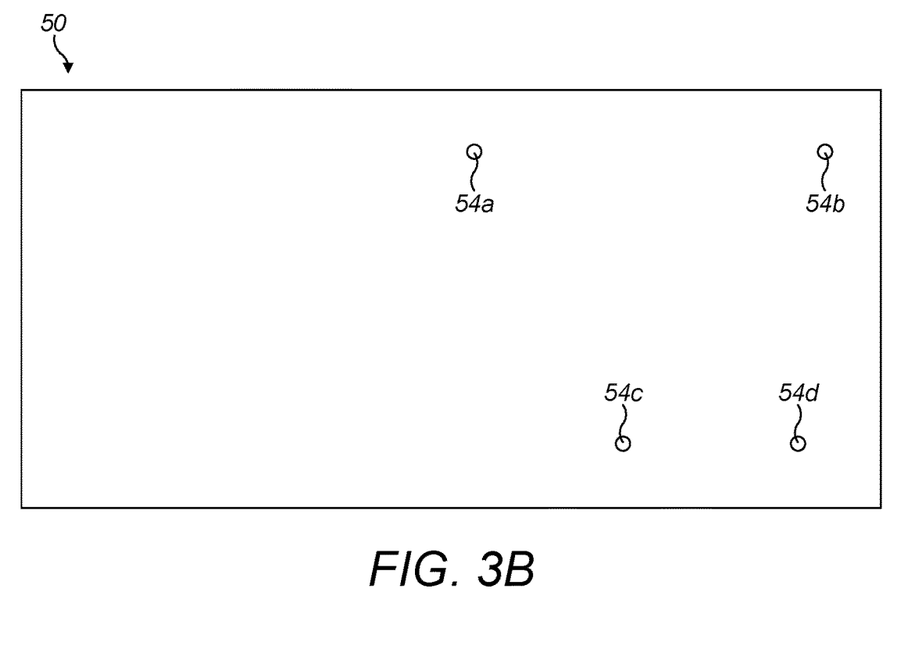

FIGS. 3 and 4 illustrate a further optimised method of fabricating a heater assembly according to the present invention including a number of additional features which assist with the accurate alignment of the heat shrink film 50 relative to the heating element 20 and backing film 30. In this method, as shown in FIGS. 3A and 3B, a series of alignment holes 34, 54 are provided in both the backing film 30 and heat shrink 50 which can be used for the relative alignment of the backing film 30 and heat shrink 50.

FIG. 3A schematically illustrates a thin film heater 10 in which the first step of providing a heating element 20 on the surface of a flexible dielectric backing film 30 has been carried out. This thin film heater 10 differs from the previous embodiments in that the backing film 30 is provided with a number of alignment holes 34a, 34b, 34c, 34d positioned in the backing film so as to be provided around the heating element 20. In particular, in this example the backing film 30 comprises two alignment holes 34a, 34b provided along a top edge of the backing film 30 as to be positioned above the heating element 20 when it is attached to the backing film 30. Two further align the holes 34c, 34d are provided below the heating area 22 of the heating element 20. Thermistor hole 37b, discussed below, many in some example provide an additional alignment hole. Similarly, the heat shrink film 50 has a corresponding number of alignment holes 54 which correspond in relative position to those alignment holes 34 of the backing film 30. The alignment holes 34, 54 are arranged such that when the holes of the backing film 30 are brought into alignment with the alignment holes 54 of the heat shrink 50, the heat shrink 50 is positioned at precisely the correct position relative to the thin film heater 10 such that the heat shrink 50 extends beyond the heating area 22 by the correct lengths 51, 52 to allow for precise alignment of the heating element 20 relative to the heating chamber 60 when attached.

The flexible dielectric backing film 30 has two further holes 37a, 37b on which the thermistor sensor head 71 is positioned, so as to expose the temperature sensing head 71 of the thermistor 70 through the backing film 30, as will be described in more detail below. As with the previous example, the backing film 30 may be any appropriate flexible electrically insulating material, for example a fluoropolymer such as PTFE, or PEEK or polyimide. In this case, the backing film 30 is provided by a 25 µm polyimide film with a 40 µm silicon adhesive layer, the heating element 20 being supported on the adhesive layer. The holes 34, 54 may be of any appropriate size, in this case 1 mm, such that they may be used with alignment pins on an alignment fixture to co-locate the alignment holes 34 of the backing film with those 54 of the heat shrink 50.

FIG. 4 illustrates a method of preparing the thin film heater assembly 100 ready for attachment to a heating chamber 60. As described above, the heating element 20 is firstly provided on the adhesive surface of the flexible dielectric backing film 30 so as to be positioned between the alignment holes 34 of the backing film 30. The heating element 20 is generally as described above although two 1 mm holes 25 are provided in the solder 24 on the heating legs 23 to enhance the welding strength when the heating element contact legs 23 are attached to the PCB.

Figure 4A:
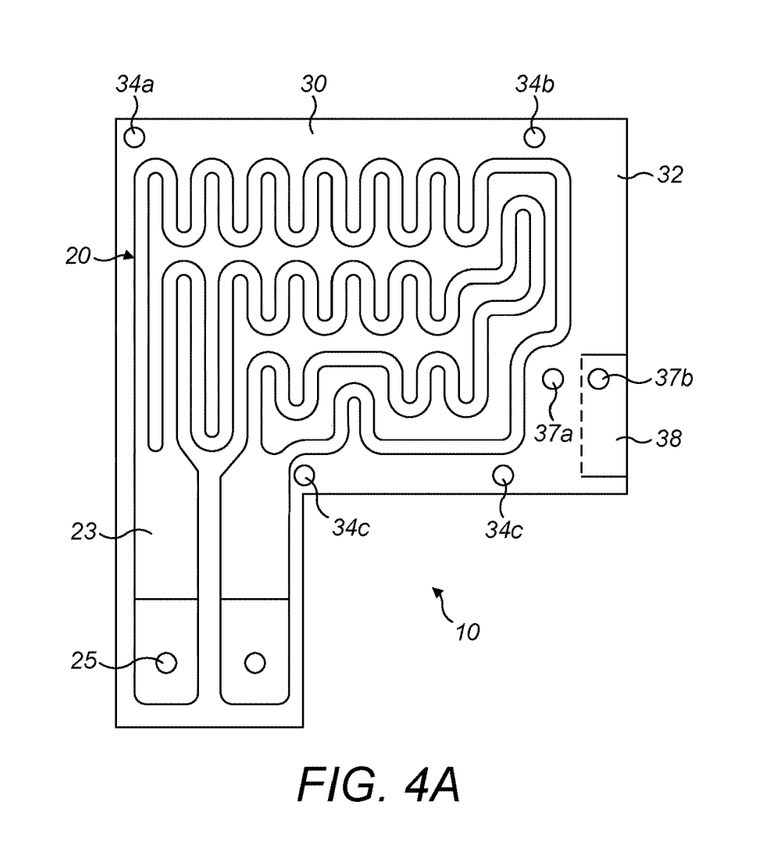
FIGS. 4A to 4D illustrate a method of fabricating a heater assembly according to the present invention.
Figure 4B:
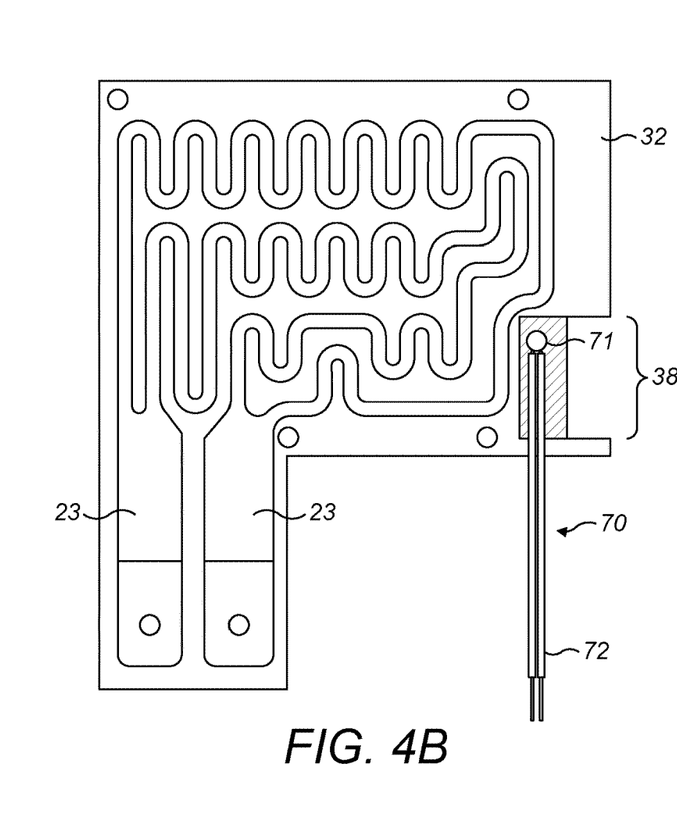

The first step in the process is to initially attach the thermistor 70 as shown in FIG. 4B. As clear from FIGS. 4A and 4B the flexible dielectric backing film 30 additionally includes a foldable portion 38 in the form of the tab 38 formed by two cuts in the backing film allowing the tab 38 to fold over on itself into the vacant region 22v into which the thermistor 70 is positioned. In this example the tab 38 is at an intermediate position along the free edge region 32 but it might equally be formed by one cut to provide a bottom part of the free edge region which can fold over the thermistor 20 when positioned. In this example the tab 38 includes thermistor hole 37b which aligns with the thermistor hole 37a provided in the flexible dielectric backing film 30 in the vacant region 22v left by the shape of the heating track 21. The thermistor hole 37b is not essential and the tab 38 may an uninterrupted surface portion which does not contain a hole, such that it folds over the thermistor leaving the thermistor only visible through the thermistor hole 37a. Thermistor hole 37b may also be used for alignment with the positioning fixture 80 in some examples, The thermistor sensor head 71 is positioned on the thermistor hole 37a in the vacant region 22v of the backing film 30 such that the sensor head is exposed through the backing film 30 to the opposing side of the thin film heater. Since the thin film heater is attached to the heating chamber 60 with the backing film in direct contact, the thermistor hole 37a allows for the thermistor sensor head 71 to be in direct contact with the heating chamber 60.

The backing film tab 38 is then folded over the thermistor 70 such that the thermistor hole 37b (if present) aligns with thermistor hole 37a and is attached via the silicon adhesive provided on the attachment surface of the backing film 30. In this way, the thermistor is attached to the backing film with the sensor head 71 attached between the backing film 30 and the folded tab 38 of the backing film which is glued in place, with the thermistor connection 72 extending in the direction approximately corresponding to that of the heater contact legs 23. This process serves to initially attach the thermistor 70 in position before the heat shrink 50 is aligned and attached with the thin film heater 10.

Figure 4C:
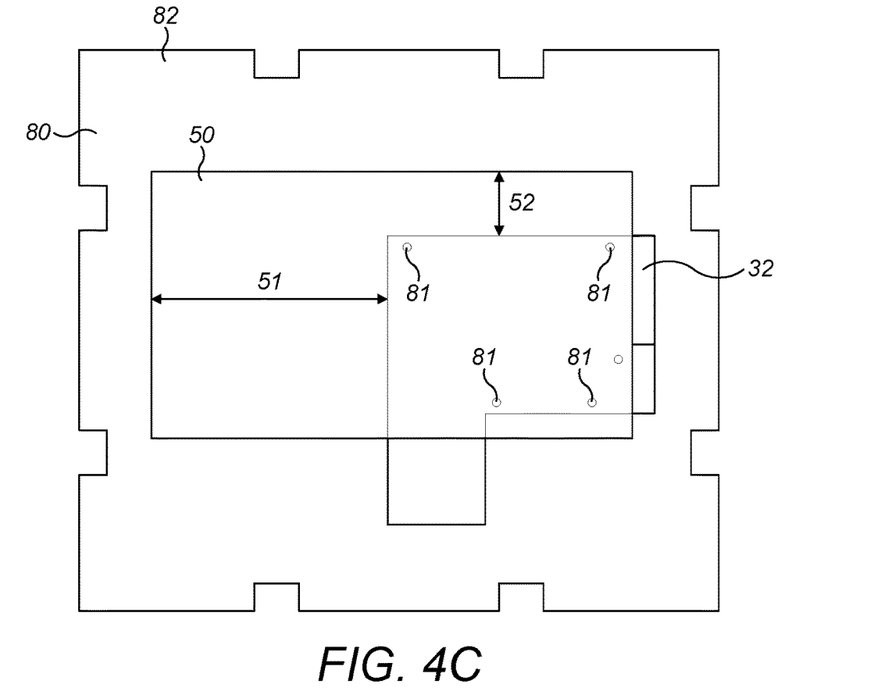

The heat shrink 50 is then aligned relative to the thin film heater 10 using a positioning fixture 80. The positioning fixture 80 comprises a supporting surface 82 with four upstanding alignment pins 81 which correspond in their relative displacement to the positions of the alignment holes 34, 54 on the backing film 30 and the heat shrink 50. The thin film heater 10 (comprising the heating element 20 on the backing film 30) is first positioned on the surface of the alignment fixture 80 such that the alignment pins 81 extend through the backing film alignment holes 34. The heat shrink 50 is then positioned over the thin film heater 10 such that the pins 81 further extend through the alignment holes 54 of the heat shrink 50. This process ensures that the heat shrink 50 is aligned precisely relative to the heating element 20 and backing film 30. In particular, when the alignment holes 34 and 54 are aligned this positions the heat shrink such that the heat shrink 50 extends beyond the heating element 20 in a direction opposite to the contact legs to provide a specific predetermined length of the alignment portion 52 and a specific predetermined length of extension of the wrapping portion 51.

Figure 4D:
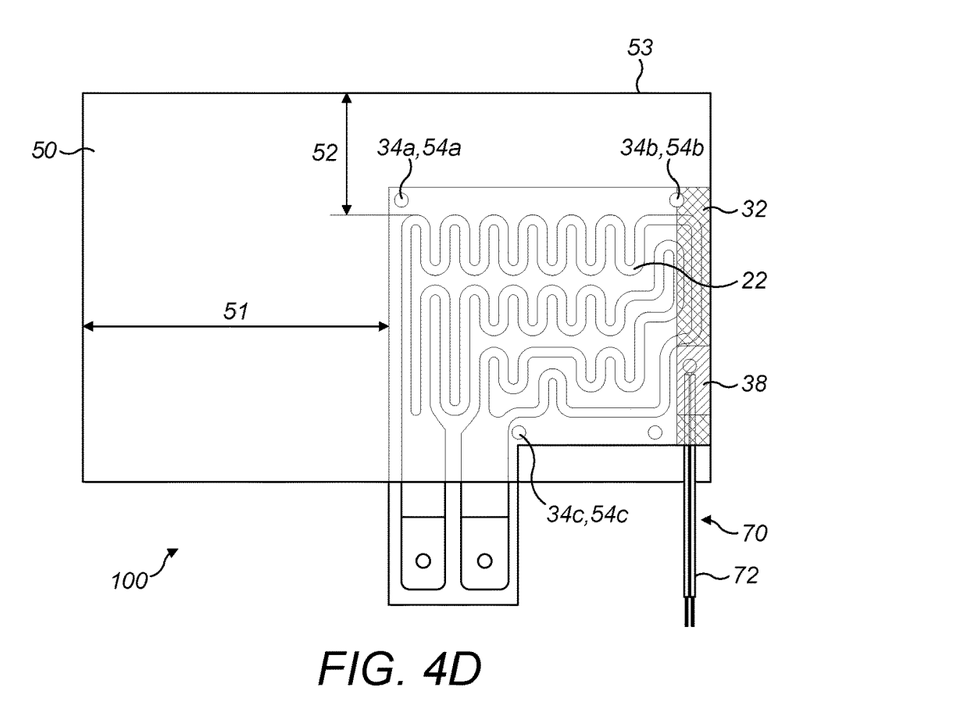

Once the heat shrink 50 is correctly positioned as shown in FIGS. 4C and 4D, the peripheral edge region 32 of the backing film 30 which is left free by the positioning of the heat shrink 50 is folded over on top of the heat shrink as shown in FIG. 4D to seal this edge of the backing film 30 and heat shrink 50 layers. This secures the heat shrink 50 to the backing film 30 and additionally secures the thermistor connections 72 in position. The assembled thin film heater sub-assembly 100 shown in FIG. 4D can then be attached to the heating chamber 60 as described above in reference to FIGS. 2E to 2H. In particular, by aligning the top edge 53 of the heat shrink 50 with the top edge 62 of the heating chamber 60 the heating area provided by the heating track 22 is positioned at the required point on the heating chamber 60 to provide efficient heating to a consumable received within the chamber 60. The wrapping of the thin film heater sub-assembly 100 onto the chamber can be performed by hand as shown in FIG. 2E or equally this can be carried out in an automated process by a device which rotates the heating chamber 60 relative to the thin film heater to secure it in place. As described above, the thin film heater assembly 100 is sealed to the heating chamber 60 via heating to shrink the heat shrink 50 to secure the heater tightly against the outer surface of the heating chamber 60.

As described above it is important to guarantee a precise distance between the top edge of the heat shrink layer 53 and the heating track 21 such that the heating area 22 can be reliably positioned on the heating chamber. The fact that the flexible backing film is thin and soft it can undergo tensile deformation during the process of assembling the heater assembly 100 which can alter the prescribed distance of this alignment region 52. In order to ensure that this predefined distance 52 is provided reliably and reproducibly, the method can further include a number of additional steps to guarantee this. Firstly, the heat shrink 50 is made slightly longer in the vertical, alignment direction (the direction opposite to the direction of extension of the contact legs 23 when attached to the backing film). For example, the heat shrink film 30 can be increased in length by 1 mm. The distance between the top of the heater track 21 and the top of the heat shrink film will then be 1 mm more than the required size to provide the heater track 21 in the correct position. Once the heat shrink has been attached as shown in FIG. 4D, the heat shrink layer 50 is then punched, for example using precision stamping, to cut the heat shrink to size and remove this excess part. In this way, if the heat shrink has deformed or moved during the initial assembly steps, this subsequent cutting step guarantees the accuracy in the distance between the heater track 21 and the top edge 53 of the heat shrink 50 which can provide a precision of around 0.3 mm sufficient to achieve accurate placement of the heater area 22.

As described above the thermistor is placed with the sensor head in the thermistor hole 37a and hole 37b in the tab 38 of the backing film 30 is folded over onto the sensor head 71. This ensures the thermistor is always placed accurately relative to the heating element 20 and it also means that the sensor head 71 of the thermistor 70 is directly in contact with the outer surface of the heating chamber 60 so there is no intervening insulating material, thereby increasing precision in the temperature reading provided by the thermistor 70.

Once heat treated to contract the heat shrink film 50 to secure the heating element, the heater sub-assembly 110 shown in FIGS. 2G and 2H can then be employed in a heating device, such as an aerosol generating device by attaching the thermistor connection 72 and the heated contact legs 23 to a PCB and power source. The method of assembly according to the present invention reduces the number of assembly steps compared to known methods, providing a much more efficient and cost effective assembly method. Importantly, the number of insulating thin film layers is reduced because the heat shrink 50 provides both the insulating layer and means of attaching the thin film heater 10 to the heating chamber 60. The thermal properties of the heater assembly 110 are therefore improved and the heat transfer efficiency is enhanced. The method of using the extending portions of the heat shrink 50 to align the thin film heater assembly 100 relative to the heated chamber 60 also provides a much more precise and consistent method of assembling the heater assembly to provide heating at a required position on the heating chamber 60.

The invention claimed is:

1. A method of fabricating a heater assembly comprising:
providing a heating element supported on a surface of a flexible dielectric backing film;
attaching a layer of heat shrink film onto the surface of the flexible dielectric backing film so as to at least partially enclose the heating element between the heat shrink film and the flexible dielectric backing film; and
attaching the heating element to a heating chamber with the layer of heat shrink film.

2. The method of claim 1, wherein the step of attaching includes attaching the layer of heat shrink film to extend beyond a surface area of the flexible dielectric backing film in one or more directions.

3. The method of claim 1, wherein the layer of heat shrink film is attached using an adhesive provided on the surface of the flexible dielectric backing film which supports the heating element.

4. The method of claim 1, wherein the heating element is a planar heating element comprising a heater track which follows a circuitous path over a heating area within a plane of the heating element; and two contact legs for connection to a power source, the two contact legs extending away from the heater track in the plane of the heating element; and
wherein the step of attaching includes attaching the layer of heat shrink film so as to enclose the heater track between the flexible dielectric backing film and the heat shrink film, leaving the contact legs exposed.

5. The method of claim 4, wherein the layer of heat shrink film comprises an alignment region which extends beyond the heating element by a predetermined distance in a direction opposite to a direction of the two contact legs.

6. The method of claim 5, further comprising:
cutting a marginal part of the alignment region of the layer of heat shrink film so that a distance in which the alignment region extends beyond the heating element is reduced to the predetermined distance.

7. The method of claim 4, wherein the layer of heat shrink film comprises an attachment region which extends beyond the flexible dielectric backing film in a direction approximately perpendicular to a direction of the two contact legs.

8. The method of claim 1, further comprising:
attaching a temperature sensor to the surface of the flexible dielectric backing film adjacent to the heating element; and
the step of attaching the layer of heat shrink film includes attaching the layer of heat shrink film over the heating element and the temperature sensor.

9. The method of claim 8, wherein the layer of heat shrink film is attached so as to leave an edge region of the flexible dielectric backing film next to the temperature sensor exposed, the edge region comprising an adhesive and the edge region being folded over the heat shrink film so as to seal an edge of the heat shrink film next to the temperature sensor.

10. The method of claim 8, wherein the flexible dielectric backing film comprises a through-hole in a region adjacent to the heating element,
wherein the step of attaching the temperature sensor includes attaching the temperature sensor such that the temperature sensor lies on the through-hole.

11. The method of claim 1, wherein the flexible dielectric backing film and the heat shrink film both comprise a corresponding arrangement of through-holes; wherein the method comprises:
positioning the heating element and the flexible dielectric backing film on a positioning fixture comprising an arrangement of pins with relative positions corresponding to positions of the through-holes of the flexible dielectric backing film, such that the pins extend through the through-holes of the flexible dielectric backing film; and
positioning the heat shrink film onto the heating element and the flexible dielectric backing film such that the pins of the positioning fixture enter the through-holes of the heat shrink film, thereby aligning the heat shrink film with the flexible dielectric backing film.

12. The method of claim 1, wherein when the flexible dielectric backing film is assembled with the heating element and the heat shrink film forms a thin film heater assembly; the method further comprising:
wrapping the thin film heater assembly around an outer surface of the heating chamber with the flexible dielectric backing film in contact with the outer surface of the heating chamber; and
heating the thin film heater assembly to shrink the heat shrink film, securing the thin film heater assembly against the heating chamber.

13. The method of claim 12,
wherein the heating element is a planar heating element comprising a heater track which follows a circuitous path over a heating area within a plane of the heating element; and two contact legs for connection to a power source, the two contact legs extending away from the heater track in the plane of the heating element;
wherein the step of attaching includes attaching the layer of heat shrink film so as to enclose the heater track between the flexible dielectric backing film and the heat shrink film, leaving the contact legs exposed;
wherein the layer of heat shrink film comprises an alignment region which extends beyond the heating element by a predetermined distance in a direction opposite to a direction of the two contact legs; and
wherein the step of wrapping includes using the alignment region of the layer of heat shrink film to align the thin film heater assembly to the heating chamber.

14. The method of claim 12, wherein:
the heat shrink film comprises a material which preferentially shrinks in a preferential shrinking direction when heated; and
the layer of heat shrink film is arranged so that the preferential shrinking direction corresponds with a wrapping direction.

15. A heater assembly fabricated using the method of claim 1.

* * * * *